United States Patent [19]

Kim

[11] Patent Number: 5,343,039

[45] Date of Patent: Aug. 30, 1994

[54] SCAN START DETECTING DEVICE FOR LASER BEAM PRINTER HAVING A WAVELENGTH VARIATION CORRECTING MEANS

[75] Inventor: Young S. Kim, Seoul, Rep. of Korea

[73] Assignee: Goldstar Co., Ltd., Seoul, Rep. of Korea

[21] Appl. No.: 78,412

[22] Filed: Jun. 17, 1993

[51] Int. Cl.$^5$ .............................................. H01J 5/16
[52] U.S. Cl. ...................................... 250/235; 359/17
[58] Field of Search ...................... 250/235, 236, 205; 359/17, 18, 205, 206; 346/160, 108

[56] References Cited

U.S. PATENT DOCUMENTS 4,632,499 12/1986 Noguchi et al. ........................ 359/17
5,182,659 1/1993 Clay et al. .............................. 359/17

Primary Examiner—David C. Nelms
Assistant Examiner—Que T. Le
Attorney, Agent, or Firm—Ostrolenk, Faber, Gerb & Soffen

[57] ABSTRACT

A scan start detecting device for a laser beam printer, comprising a wave length variation correcting unit arranged between a scanning unit including a scan disc hologram and a scan start detecting unit including a detector, the wave length variation correcting unit including a scan start hologram. The scan start hologram, which is a write hologram, serves to positional errors caused by a variation in wavelength, together with a pre-scan hologram arranged in front of the scan disc hologram. The correction of the scan start point is achieved, without using the cylindrical lens requiring a double surface finishing work. For the correction of the scan start point, the write hologram is used, which has the same function and yet inexpensive. Accordingly, the manufacture cost can be reduced. Where the write hologram is added with a read function, the performance thereof can be more improved. It is also possible to reduce the overall optical path of scan start beams. The number of constituting elements is also reduced, thereby enabling a compactness of products. There is also an advantage of a convenience in scan start beam alignment.

3 Claims, 4 Drawing Sheets

SCAN START DETECTING DEVICE FOR LASER BEAM PRINTER HAVING A WAVELENGTH VARIATION CORRECTING MEANS

BACKGROUND OF THE INVENTION

1. Field of the Invention

The present invention relates to a device for detecting scan start of a laser beam printer, and more particularly to a scan start detecting device for a laser beam printer, capable of detecting a correct scan start position.

2. Description of the Prior Art

Referring to FIGS. 1, 2A and 2B, there is illustrated a light source controlling device of a conventional laser beam printer. As shown in the drawings, the scan start detecting device comprises a light source unit a including a laser diode 21 and a collimator 22, a scanning unit b including a motor 25 and a scan disc hologram 24, a scan start detecting unit c including a cylindrical lens 33 and a detector 34, and a light source control unit d for receiving a signal outputted from the detector 34 and controlling the laser diode 21 of light source unit a, based on the received signal.

In an operation of the scan start detecting device with the above-mentioned construction, laser beams emitted from the laser diode 21 of light source a are fed to the collimator 22 in which they are converted into approximately parallel beams. The beams are then fed to the scan disc hologram 24 of scanning unit b, via a pre-scan hologram 23.

The scan disc hologram 24 of scanning unit b rotates by the driving force of motor 25. The scan disc hologram 24 scans the laser beams while rotating.

The scanned laser beams are then fed to a photosensitive drum 31, via planar mirror 26 and 27, non-spherical mirror 28 and planar mirrors 29 and 30, as shown in FIG. 2A. The beams are also fed to a planar mirror 32. The planar mirror 32 varies an optical path along which the beams are fed, so that the beams pass through the cylindrical lens 33 of scan start detecting unit c and then enters the detector 34. An output signal from the detector 34 is received in the light source controlling circuit d which, in turn, controls the laser diode 21, so as to turn on or off it, based on the received signal.

In the conventional device, however, the optical path of laser beams may be varied due to a variation in diffraction angle caused by a variation in wavelength in the laser diode 21. Such a variation in optical path results in a positional variation in scan start point. As a result, it is impossible to detect a correct scan start point.

Furthermore, the cylindrical lens 33 employed in the scan start detecting unit c is expensive, since it is fabricated by grinding its opposite surfaces. As a result, there is a disadvantage of an increase in manufacture cost.

SUMMARY OF THE INVENTION

Therefore, an object of the invention is to provide a scan start detecting device of a laser beam printer, capable of detecting a correct scan start point by correcting a variation in scan start caused by a variation in wavelength and a vibration of the laser diode.

In accordance with the present invention, this object can be accomplished by providing a scan start detecting device for a laser beam printer, comprising: light source means adapted to laser beams; scanning means adapted to scan the laser beams emitted from the light source, the scanning means including a hologram and a motor; wavelength variation correcting means adapted to diffract the laser beams at different angles, depending on a variation in wavelength of the laser beams emitted from the light source means, transmit the diffracted laser beams to the scanning means, and correct optical paths of the laser beams from the scanning means, the optical paths having been differently varied depending on the variation in wavelength, and transmit the corrected laser beams to the same point on a detector of scan start detecting means; and light source controlling circuit adapted to control the light source means, based on a signal outputted from the scan start detecting means.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 1:
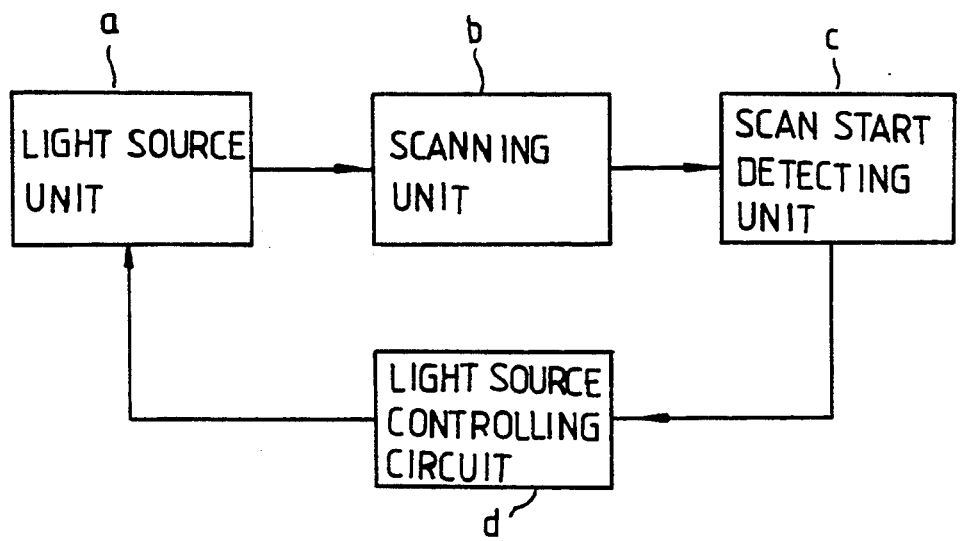
FIG. 1 is a block diagram of a conventional scan start detecting device of a laser beam printer.
Figure 2A:
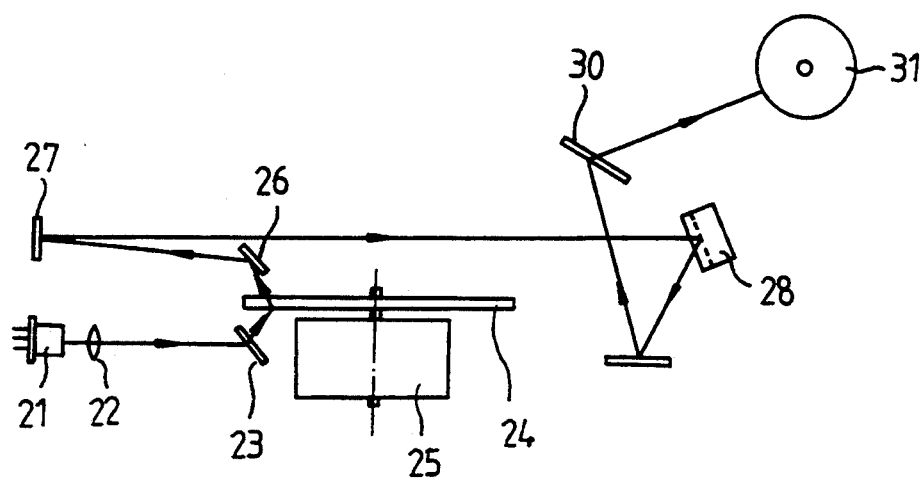
FIGS. 2A and 2B are a schematic front view and a schematic plan view illustrating an optical system of the conventional scan start detecting device, respectively.
Figure 2B:
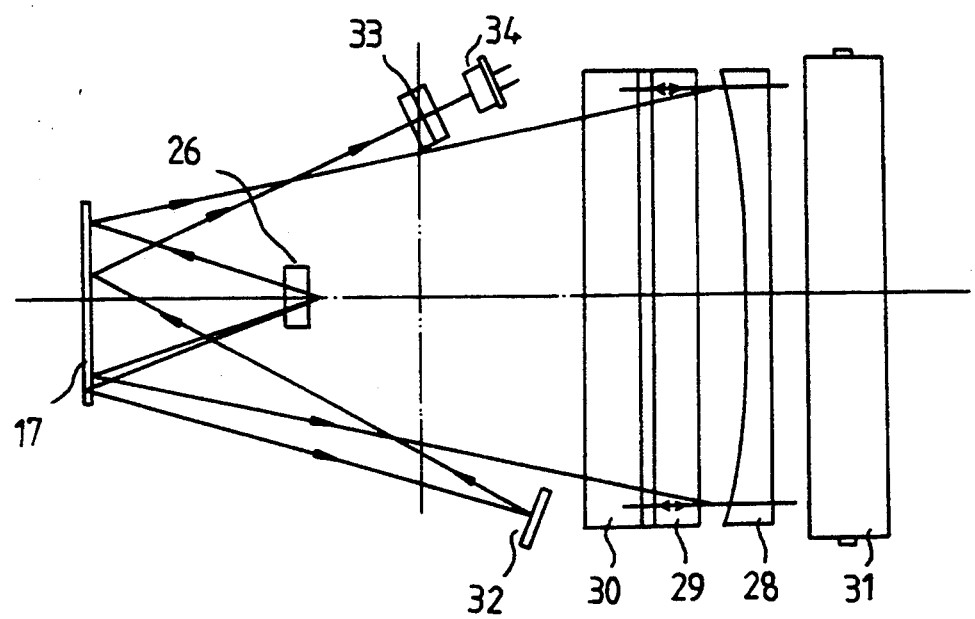
Figure 3:
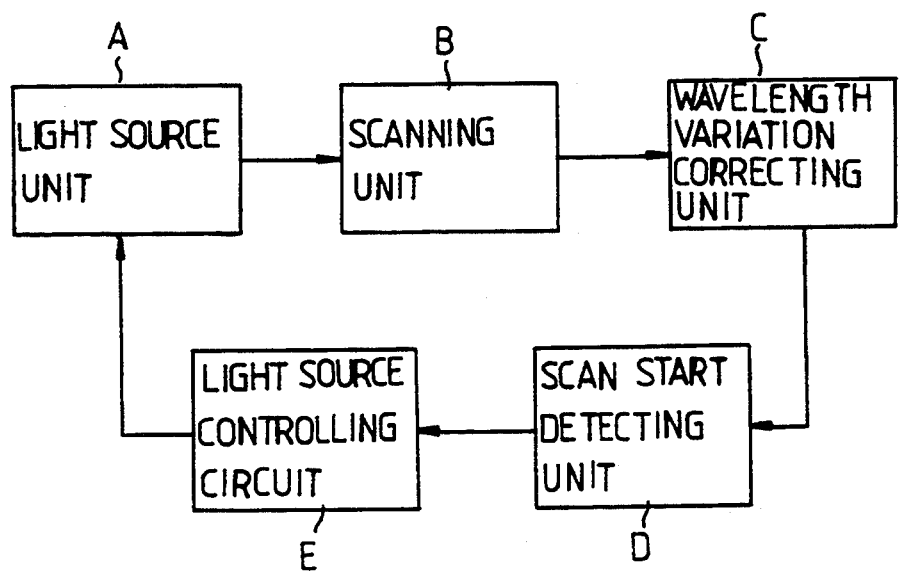
FIG. 3 is a block diagram of a scan start detecting device of a laser beam printer, in accordance with the present invention.
Figure 4A:
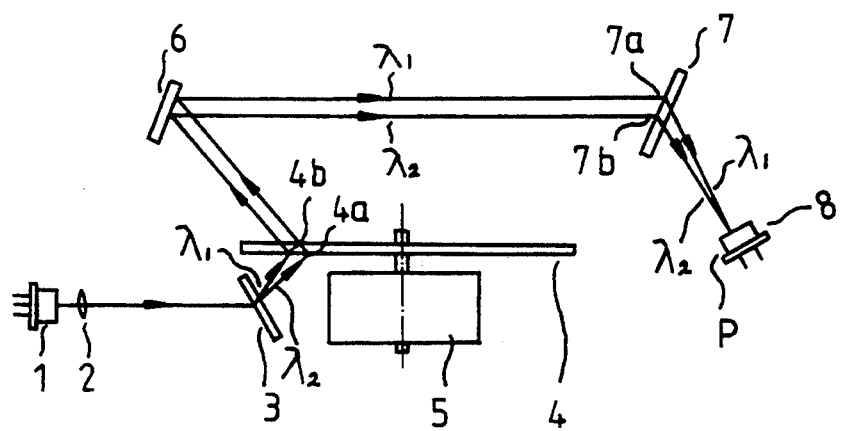
FIGS. 4A and 4B are a schematic front view and a schematic plan view illustrating an optical system of the scan start detecting device according to the present invention, respectively.
Figure 4B:
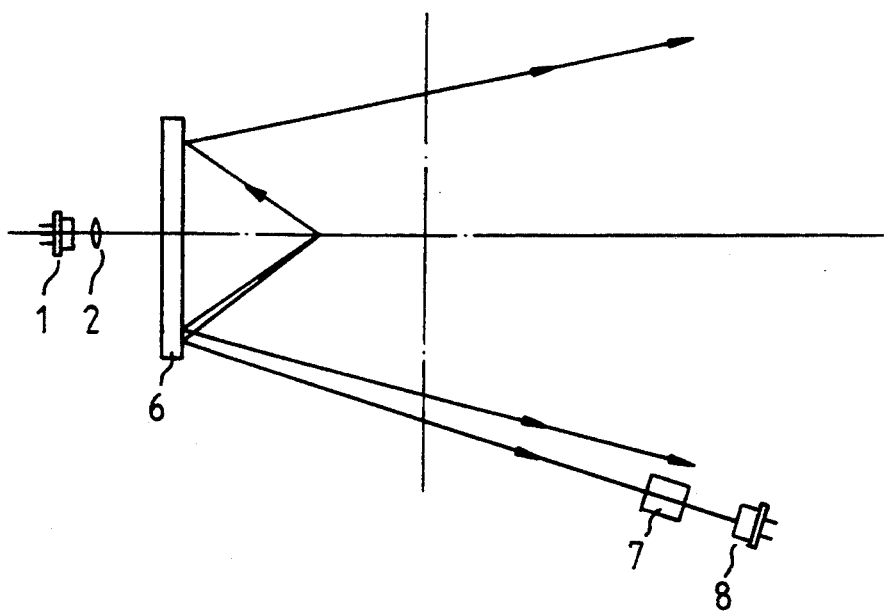

FIG. 3 is a block diagram of a scan start detecting device of a laser beam printer, to which the present invention is applied. FIGS. 4A and 4B are schematic views illustrating an optical system of the scan start detecting device according to the present invention.

As shown in FIGS. 3, 4A and 4B, the scan start detecting device to which the present invention is applied comprises a light source unit A for emitting approximately parallel laser beams, a scanning unit B for scanning the laser beams emitted from the light source unit A, a wavelength variation correcting unit C for correcting a variation in wavelength of the laser beams scanned by the scanning unit B, a scan start detecting unit D for detecting a scan start for detecting the corrected laser beams, and light source controlling circuit E for receiving a signal outputted from the scan start detecting unit D and controlling the light source unit A, based on the received signal.

The light source unit A includes a laser diode 1 adapted to emit laser beams and a collimator 2 adapted to convert the laser beams emitted from the laser diode 1 into approximately parallel beams.

The scanning unit B includes a scan disc hologram 4 which rotates by a driving force of a motor 5 and serves to diffract the laser beams.

The scanning unit B also includes a scan start beam mirror 6 for reflecting the laser beams diffracted in the scan start hologram 4, toward the scan start detecting unit D.

The wavelength variation correcting unit C includes a pre-scan hologram 3 arranged in front of the scan disc hologram 4 and a scan start hologram 7 arranged in rear of the pre-scan hologram 3.

The scan start detecting unit D comprises a detector 8 for detecting scan start beams emerging from the wavelength variation correcting unit C.

The light source controlling circuit E includes a scan start controlling circuit for receiving an output signal from the detector 8 and controlling an activation of the laser diode 1 of light source unit a.

The pre-scan hologram 3 is comprised of a hologram for diffracting plane waves, whereas the scan start hologram 7 is comprised of a write hologram having a cylindrical lens function.

Figure 5:
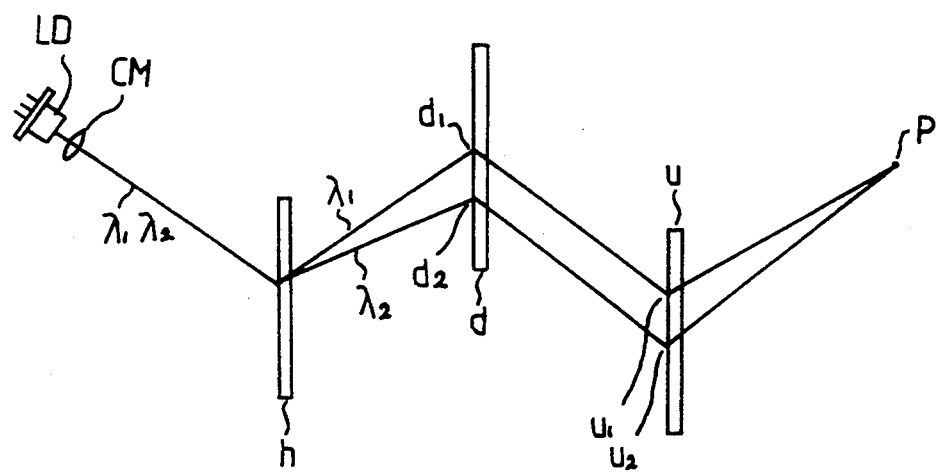
FIG. 5 is a schematic view illustrating a principle of the present invention for correcting an error caused by a variation in wavelength.

FIG. 5 shows a principle of the present invention for correcting an error caused by a variation in wavelength. As shown in FIG. 5, when laser beams with a wavelength $\lambda_1$ emitted from a laser diode LD and passing through a collimator CM are partially converted into beams with a wavelength $\lambda_2$, due to a variation in temperature, each laser beam $\lambda_1$ and each laser beam $\lambda_2$ are diffracted by a hologram h at different angles.

As a result, the diffracted laser beams are incident on different points $d_1$ and $d_2$ at different incident angles. Thereafter, the laser beams are fed to a hologram u.

Where the point $d_1$ has a lattice density higher than that of the point $d_2$, the laser beams diffracted at the two points $d_1$ and $d_2$ are fed in parallel, so that they enter different points $u_1$ and $u_2$ of the hologram u, at the same incident angle.

When the point $u_1$ has a lattice density higher than that of the point $u_2$, the laser beams are diffracted, so that they are concentrated at a point P.

Thus, the error caused by the variation in wavelength can be corrected.

Now, operation of the construction according to the present invention will now be described, in conjunction with the above-mentioned principle.

Laser beams emitted from the laser diode 1 of light source unit A are fed to the collimator 2 in which they are converted into approximately parallel beams. The beams are then introduced in the pre-scan hologram 3 in which they are diffracted. The diffracted beams from the pre-scan hologram 3 enter the scan disc hologram 4 in which they are scanned.

The beams scanned in the scan disc hologram 4, namely, the scan start beams are then reflected by the scan start beam mirror 6, so that its optical path is varied. As a result, the beams are incident on the scan start hologram 7.

The scan start beams incident on the scan start hologram 7 is error-corrected so that a positional error caused by a variation in wavelength from $\lambda_1$ to $\lambda_2$. By this error correction, the beams are incident on a single point of the detector 8 constituting the scan start detecting unit d.

The detector 8 outputs a control signal at the source circuit E including the scan start controlling circuit. By the control signal, the laser diode 1 is controlled to be turn on or off.

That is, where the laser beams with the wavelength $\lambda_1$ emitted from the laser diode 1 and passing through the collimator 2 are partially converted into beams with the wavelength $\lambda_2$, due to a variation in temperature, each laser beam $\lambda_1$ and each laser beam $\lambda_2$ are diffracted at different angles by the pre-scan hologram 3 which is the plane wave diffracting hologram.

As a result, the diffracted laser beams are incident on different points 4a and 4b at different incident angles.

Where the point 4a has a lattice density higher than that of the point 4b, the laser beams diffracted at the two points 4a and 4b are fed in parallel. Accordingly, the beams enter different points 7a and 7b of the scan start hologram 7 at the same incident angle.

When the point 7a has a lattice density higher than that of the point 7b, the laser beams $\lambda_1$ and $\lambda_2$ are diffracted, so that they are concentrated at a point P on the detector 8.

Thus, the error caused by the variation in wavelength can be corrected.

As apparent from the above description, the present invention achieves an error correction caused by a variation in wavelength, by 1the function of the pre-scan hologram 3 arranged in front of the scan disc hologram 4 as well as the function of the scan start hologram 7. Accordingly, it is possible to always detect a correct scan start point, and thus obtain a good printed picture quality.

In accordance with the present invention, the correction of the scan start point is achieved, without using the cylindrical lens requiring a double surface finishing work. For the correction of the scan start point, the write hologram 7 is used, which has the same function and yet inexpensive. Accordingly, the manufacture cost can be reduced. Where the write hologram 7 is added with a read function, the performance thereof can be more improved.

It is also possible to reduce the overall optical path of scan start beams. The number of constituting elements is also reduced, thereby enabling a compactness of products. There is also an advantage of a convenience in scan start beam alignment.

Although the preferred embodiments of 1the invention have been disclosed for illustrative purposes, those skilled in the art will appreciate that various modifications and additions are possible, without departing from the scope and spirit of the invention as disclosed in the accompanying claims.

What is claimed is:

1. A scan start detecting device for a laser beam printer, comprising:
   light source means adapted to laser beams;
   scanning means adapted to scan the laser beams emitted from the light source, the scanning means including a hologram and a motor;
   wavelength variation correcting means adapted to diffract the laser beams at different angles, depending on a variation in wavelength of the laser beams emitted from the light source means, transmit the diffracted laser beams to the scanning means, and correct optical paths of the laser beams from the scanning means, the optical paths having been differently varied depending on the variation in wavelength, and transmit the corrected laser beams to the same point on a detector of scan start detecting means; and
   light source controlling circuit adapted to control the light source means, based on a signal outputted from the scan start detecting means.

2. A scan start detecting device in accordance with claim 1, wherein the wavelength variation correcting means comprises:
   a plane wave diffracting hologram adapted to diffract the laser beams emitted from the light source means at different angles, depending on the variation in wavelength of the laser beams and transmit the diffracted laser beams to the scanning means;

a plane mirror adapted to vary the optical paths of the laser beams from the scanning means; and a hologram having a cylindrical lens function for correcting the optical paths of the laser beams from the plane mirror, to transmit the laser beams to the same point on the detector, the optical paths having been varied depending on the variation in wavelength.

3. A scan start detecting device in accordance with claim 1, wherein the wavelength variation correcting means is arranged between the scanning means and the scan start detecting means.

* * * * *